United States Patent [19]
Wootten

[11] 4,087,302
[45] May 2, 1978

[54] METHOD FOR FORMING A STRUCTURAL PANEL

[76] Inventor: William A. Wootten, 425 Via Corta, Malaga Cove Plaza, Palos Verdes Estates, Calif. 90274

[21] Appl. No.: 798,209

[22] Filed: May 18, 1977

Related U.S. Application Data

[62] Division of Ser. No. 598,484, Jul. 23, 1975, Pat. No. 4,027,058.

[51] Int. Cl.² .............................................. B32B 31/00
[52] U.S. Cl. .................................... 156/204; 156/209; 156/227; 156/252
[58] Field of Search ........ 428/134, 136, 138, 178–179, 428/180–182, 185, 186, 116–118; 156/204, 226–227, 205, 209, 207, 250, 252, 210, 219, 220; 264/285, 286, 284

[56] References Cited
U.S. PATENT DOCUMENTS

| | | | |
|---|---|---|---|
| 1,875,188 | 8/1932 | Williams | 428/185 X |
| 2,481,046 | 9/1949 | Scurlock | 428/186 X |
| 3,009,277 | 11/1961 | Scherotto | 428/181 X |
| 3,018,205 | 1/1962 | Barut | 428/116 |
| 3,370,520 | 2/1968 | Mauch | 428/178 X |
| 3,703,432 | 11/1972 | Koski | 428/134 X |

*Primary Examiner*—David A. Simmons
*Attorney, Agent, or Firm*—Pollock, Vande Sande & Priddy

[57] ABSTRACT

Metal, fiber or plastic panels are fabricated by the attachment of planar imperforate and/or partially perforated outer sheets to a specially formed center member comprising a web or sheet having a deformed surface defining an array of adjacent triangular projections and depressions. The center member is produced by the longitudinal cutting and folding of the web as it passes between two forming cylinders which mesh with one another, the cylinder peripheries carrying complementary arrays of spaced triangular-shaped tooth elements having their base lines aligned in the opposing cylinders, to shear and thereby relieve the passing web laterally so as to produce intermittent parallel cuts and angular folds in the web while gathering the web longitudinally thereby to form triangular, flat-topped cells in the center member. Instead of using two outer sheets, the formed center member can be used per se, e.g., as a packing medium, or it can be combined with only one outer sheet to form a single-face product.

10 Claims, 18 Drawing Figures

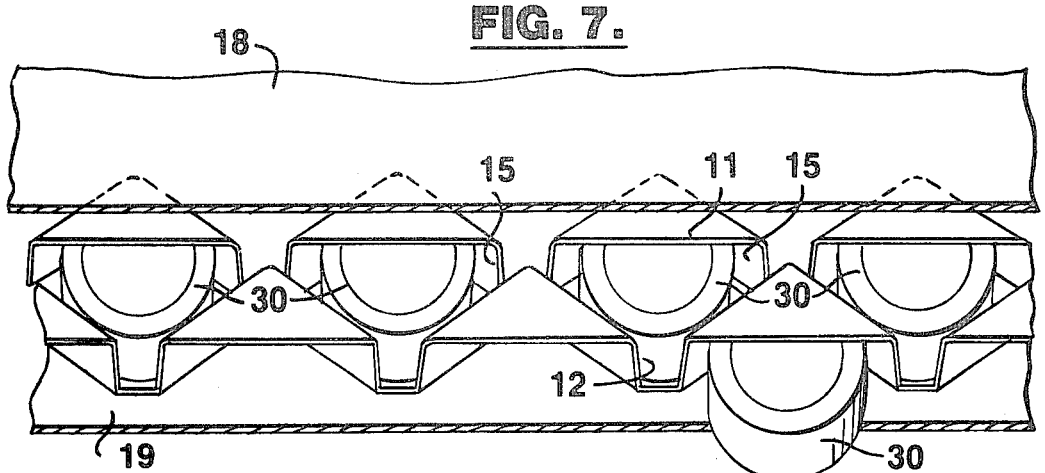
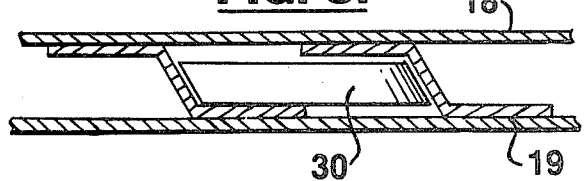
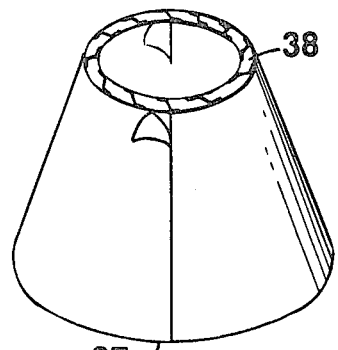
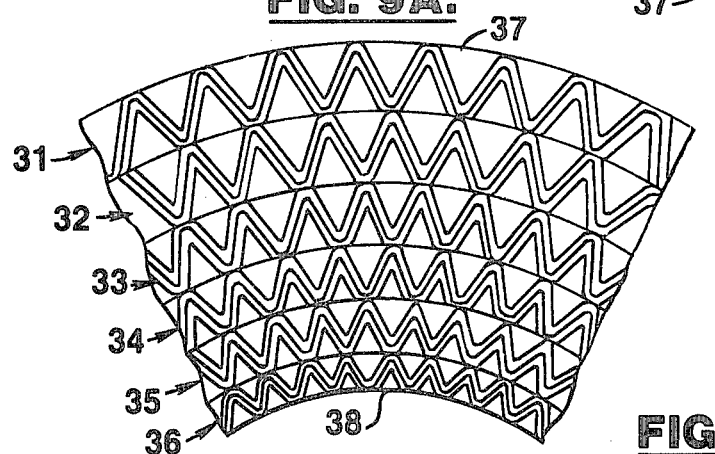
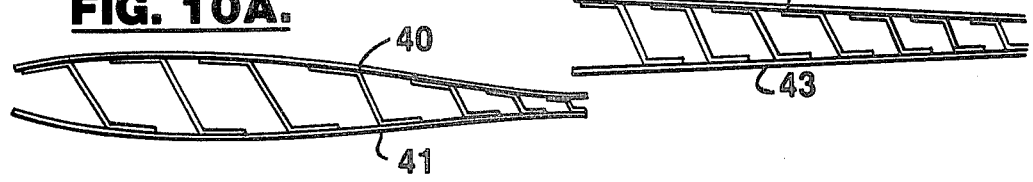

METHOD FOR FORMING A STRUCTURAL PANEL

BACKGROUND OF THE INVENTION

This is a division of application Ser. No. 598,484, filed July 23, 1975, now U.S. Pat. No. 4,027,058.

The present invention relates generally to a method for forming and shaping metal, plastic, paper, fiberboard, paperboard, or the like, sheets or webs in the assembly and construction of a novel product, consisting of or comprising an expanded triangularly celled structure useful per se as a packing material or, when combined with one or more face sheets, useful in the makeup of packages and containers for enclosing articles of commerce, or useful as rigid structural panels in the assembly of various structures, or in the construction of buildings or manufacture of vehicles or parts thereof.

At present, one generally accepted method of joining flat webs of, e.g., paperboard or fiberboard material, to produce a panel product having a thickness dimension greater than that of the material employed in its makeup, is the assembly of so-called corrugated board stock fabricated, for example, from coarse fiber kraft material referred to in the trade as liner board, and a center medium material. This known product comprises a laminate of two outer liner sheets bounding a fluted center medium member which is corrugated by passage through meshing or gear-like cylinders with subsequent "take-up" of some 50% of the length of the medium in the formation of convolutions therein. Adhesive is applied to the apex of each convolution of the center medium to attach the planar outer sheets thereto thus producing a panel configuration. This known product exhibits rigidity in a direction parallel to the corrugations or convolutions and is generally weak in a direction at right angles to these convolutions.

There is a broad similarity between the present invention and the production of such corrugated board stock in that the present invention also contemplates that two outer liner sheets can be attached to opposite sides of a center medium sheet after the center sheet has passed between forming cylinders. In the present invention, however, the center medium is not corrugated and, instead, is shaped by special forming cylinders to define an array of triangular, alternately displaced forms, the planes of the triangles serving to provide areas for adhesive attachment of the center medium to the outer liner sheets, and the sides of each triangle being folded generally perpendicular to the planes of the liner sheets, thus providing a displacement, or spacing, between the alternate triangular forms so that their planes alternately face opposite sides of the center medium.

Like corrugated media, the preparation of the center medium employed in the present invention is accomplished by use of gear-like forming cylinders but the cylinder peripheries are provided with dual-opposed helical tooth arrangements each of which is broken into a series of triangular elements engaging complementarily shaped recesses in the opposite cylinder. Unlike the known corrugating procedure, the method and apparatus of the present effects intermittent cutting of the web being formed in a plurality of parallel lines oriented longitudinal to the web direction. The cuts are displaced from line to line, thus permitting folding of the triangular sides of each element without lateral take-up in the web. The take-up entirely in the longitudinal direction of web extension or travel.

A second known method for joining flat sheets employs a cellular configuration between sheets fabricated by a variety of procedures to form so-called "honeycomb" shapes, the side planes of which are perpendicular to said sheets. The "honeycomb" edges are attached to the boundary sheets by bonding means. The product of the present invention is also broadly similar to honeycomb in that the triangular side fold of each element or cell provides ribs which are generally perpendicular to the outer sheet, panel or web, to form cellular enclosures. However, unlike honeycomb, the base line of each triangular form in the present invention is cut, to relieve the web laterally and to provide one open side, thus permitting the passage of gas or fluid through and between these cellular members throughout the structure. Moreover, unlike honeycomb, the forming apparatus and process of the present invention permits high speed forming and assembly of the novel product of the present invention in virtually all materials, employing bonding or mechanical means for connection of the formed center medium to one or more outer boundary sheets.

The principal industrial advantage of the present invention lies in the simplicity of the process with which the product is achieved. A combination of web handling apparatus may be employed, for example, in which three webs pass from unwind rolls through draw rolls or delivery apparatus with one web passing through the nip of a pair of forming cylinders having the dual opposed helical-triangular forms described earlier, operative to cut and fold the web constituting the center member of the final product, followed by passage of the formed web to adhesive applicators which apply adhesive to the flat triangular planes formed on each side of the formed mechanism, followed by laminating steps introducing two planar outer webs to opposite sides of the center member with required heating or cooling to bond or set the adhesive agent used.

The novel forming cylinders used in the present invention can be mounted in existing corrugated machinery in place of the conventional corrugating cylinders customarily used in such machinery. Operational speeds of the resulting equipment are better than those of existing corrugating equipment however, because of the larger areas afforded for connecting of the outer liner sheets to the center medium. Moreover, unlike conventional corrugating apparatus, the forming cylinders of the present invention permit repair without need for replacement of an entire cylinder or even demounting the cylinder for this purpose.

It has been found that the cutting and folding procedures employed in the present invention exhibit substantial improvements over techniques utilized heretofore in conjunction with distensible materials that are formed by application of heat and/or pressure. Such distensible materials lend themselves to embossing, vacuum forming, and other procedures involved in the cutting of a web, e.g. like those described in Koski U.S. Pat. No. 3,703,432 issued Nov. 21, 1972, where embossing and cutting wheels or cylinders are utilized which depend upon the utilization of heat, and which effect a change of gauge in the material since the formed shape is created by drawing material from the adjoining areas.

In the production of the formed panel of the present invention, the gauge of the material is maintained substantially constant since the material is merely folded, and since the folds are accommodated in such a way that a uniform take-up occurs only in the longitudinal direction of the web. To achieve such folding, a triangular form must be employed in which the sides extend along straight lines. Similarly, the several triangular forms must be identical and must dispose base lines oppositely and alternately to gather the web uniformly across the web width. In addition, the cutting and folding procedures employed in the present invention minimize the space or intervals between the base line cuts. The space between adjacent cuts should be approximately one-twelfth the length of a given cut and preferably never more than 15% or less than 5% of said length. The radius of the nose or apex of the triangular form in the plane, as well as in the perpendicular relationship, must have a diameter equivalent to this spacing. With such proportioning, the hazard of puncturing the web or causing it to distort objectionably is substantially reduced. The end result is quite different from that effected in the aforementioned Koski patent since the triangular form contemplated therein is not self-accommodating, and folding of the Koski triangular form, even with the cut relief in the sheet, is not possible without deforming, distending or stretching the material. In the present invention, the cuts employed open the sheet and make possible the gathering of the material by the accommodation of the folding in alternating planes so that the thickness of the combination thus achieved is a function of the shared fold dimension of each triangle side.

The base line cuts in the present invention can be other than a straight line without disturbing the folding characteristics of the folded side of the triangular shape, or its formation. A curved cut, or one of "u" shape can, if desired, be employed, e.g., as an auxiliary means for connecting cover sheets or webs to the folded center panel.

It is accordingly an object of this invention to produce a board or panel having a central medium of novel configuration exhibiting isotropic rigidity and strength, with respect to its plane.

It is a further object to provide such a novel medium or panel having a configuration adapted to receive additions of reinforcement within the openings of the medium for the purpose of enhancing column strength and improving the flat crush properties of the medium.

It is also an object to provide a novel panel having a center medium which is reinforced by discs or washers enclosed within the confines of the dual triangular cells of the novel medium, to improve column strength and the flat crush properties of the overall panel.

It is also an object of this invention to provide an apparatus and process capable of achieving high speed production of board or panels of novel configuration fabricated from any of a variety of materials and in any of various different gauges, all by employing generally the same machine configuration.

It is a further object to apply the process of the present invention in conjunction with known spiral winding techniques, in the production of individual packaging forms such as tubs, buckets, barrels and rectangular and square configurations fabricated of a novel medium.

Another object of this invention is the provision of a technique which, through the introduction of process variations achieves a variation in the triangular cell form size of the novel medium with respect to lateral web direction, to provide web crescents or arc forms adaptable to the making of tapered tubs, buckets, cups and other nested configurations.

It is another object to provide a novel forming apparatus capable of axial adjustment in a longitudinal direction of one or both cylinders employed in the invention, so that the triangular base line of each tooth component engages its adjoining member in controlled shear relationship to that member. A related object is to provide an apparatus wherein the shear adjustment is openable to provide for displacement of material rather than cutting thereof when a web of flexible plastic material is being formed, thereby to cause the material to flow under pressure so as to provide a membrane, or a closed cell form in the formed medium.

It is a further object of this invention to employ various side fold dimensions of the triangular components of the formed center member so a variation is spacing between panels and a variety of widths or gauges can be achieved without changing the center spacing of the triangular forms utilized.

It is another object of this invention to provide added strength in the combination by reducing the number of triangular components per unit area in said center panel, or, conversely, to increase the gauge substantially by enlarging the size and decreasing the number of triangular components provided per unit area.

A further object of this invention is to provide an apparatus that simultaneously cuts and folds a component in the plane of the web as it passes between two forming cylinders, thus permitting a gathering or take-up of the web in its longitudinal direction, while providing relief in the lateral direction, thus accomplishing diagonal and generally perpendicular folds which are alternately placed in relation to the direction of web travel.

It is another object of this invention to control the interval or spacing between longitudinal cuts in the novel medium, to permit expansion of the sheet by a folding of the triangular forms produced without tearing or overtly distorting the uncut areas of the sheet. A further object is to use contoured surfaces on the periphery of forming cylinders which are arranged to cut and fold a web in novel fashion thereby to produce lateral variations in gauge in a given web as it passes through the forming cylinders.

It is a further object of this invention to produce a novel product that lends itself to connection by overlapping and the telescoping of triangular forms within one another to produce a seam in a cylindrical product fabricated from the formed medium of the present invention.

It is a further object to be able to produce a cylindrical product, fabricated from the formed medium of the present invention, which will wind on a 45° mandrel, as in spiral winding, or which will wind, as is normal, in line with the longitudinal direction of web travel.

It is a further object of this invention to provide a novel process and product wherein a web is provided with parallel cuts longitudinally of the web, and wherein the web material is folded along the cuts while alternating the fold direction, to produce a series of angular truss-like forms in which the longitudinal apexes of the resultant forms connect the formed members to the planes of one or more outer panels associated therewith.

SUMMARY OF THE INVENTION

The objects of the present invention are achieved by converting three or more flat fiber, metal or plastic sheets or webs into a combination panel, the panel having a flat, tapered or contoured gauge and a dimensional thickness generally greater than the combined thicknesses of the sheets employed. The panel is formed by the cutting and folding of a center sheet member into triangular adjoining shapes, alternately disposed in parallel rows, each of which is cut open along its base line while leaving a short connecting portion of the center sheet to sustain the continuity of the web, followed by laminating steps in which a pair of planar outer sheets are affixed to opposite sides of the formed center sheet.

The fold, or change from the plane position, in each triangular formation of the center panel has generally perpendicular sides, but tends to slope in keeping with the draft characteristics of the triangular tooth components of a pair of forming cylinders that cooperate with one another to produce this shape. In the preferred form of the invention, the sides of the triangle formations are shared to effectively produce 45° alignment with respect to web direction. The bases of each triangular formation align in a plurality of rows extending longitudinal to the direction of the web. The base line cuts along this line set boundaries with respect to triangle height. The pattern of the triangular formations provides alternate planes which are in parallel relationship to one another, but displaced on opposite sides of the median line of the center sheet member so these alternate planes face in opposite directions to establish the gauge perimeters of the final panel. The arrangement of the triangular side angles can be varied to form equilateral or isosceles triangles with bases of consequent varied length and resulting variation in the angle of side alignment disposed across the web.

The formed center sheet member is combined with two outer sheets by the utilization of bonding means and laminating techniques common to the art. An additional cylinder, having a surface configuration like the pair of cylinders used to form the center member, can be engaged with the previously formed center member at one side of the center member to provide back-up for the application of a first planar outer panel so that full pressure can be applied during this first lamination step. At a following station, the combined center medium and first outer panel can be introduced to the second outer panel by passage between two plain cylinders under minimum pressure. Unlike corrugated materials, the compression strength exhibited in the formed center sheet permits, under most circumstances, a laminating function in which the two outer sheets are joined to the center member simultaneously without need for internal support.

Unlike corrugated materials, the product of the present invention can be varied substantially by a change in the tooth configurations of the cylinders employed to form the center member. The gauge of the first panel, as noted earlier, is a function of the tooth engagement, or the triangular elements telescoping into one another, at the nip of the forming cylinders. If the side slope taper of the teeth is continued so that the tooth height is increased, the panel gauge is increased proportionately. However it is important to note that there is no change in the longitudinal take-up of the web with such an increase in tooth height. The material taken from the web to produce the thickness of the formed center medium is taken from the plateau of plane area of each triangle, and this area can actually be diminished to a point, thus forming the shape of a half-pyramid, if carried to the extreme. The fact that longitudinal web take-up is unchanged by this variation in thickness of the center medium makes possible the production of a product which is contoured or tapered in the lateral direction. This can be done by varying the height of the triangular components on a profile line parallel to the axis of the forming cylinder. In similar fashion a panel of tapered configuration or form can be achieved by variation in the triangle height, as well as the cylinder engagement, along the same profile line.

The forming apparatus used in the present invention comprises two forming cylinders of special design and shape that differ from prior art structures. These forming cylinders comprise surface areas studded with discrete trangular shapes disposed around the cylinder periphery in a dual-opposed helical tooth array, dimensionally arranged so each element engages another in a fashion analogous to gear teeth. A portion of each triangular element, more particularly its base line, is placed on one cylinder to engage the inverted identical portion of a form on the opposite cylinder so that shear occurs when these two portions engage. As a result, as a web or sheet passes through the nip or engagement of the forming cylinders, a series of intermittent longitudinal cuts are formed in the webs as each triangular element engages its mating element in the opposing cylinder. These longitudinal openings in the web are on parallel lines that relieve the material laterally while permitting formation of an angular fold with alternating opposite angles, thereby to form the two sides of each triangular formation in the web. The triangular pattern produced in the web defines a generally square grid configuration, disposed with sides angularly aligned, forming bisecting ribs generally perpendicular to the plane of the outer sheets.

The specific apparatus form of the cylinders can be produced in a variety of ways. Each discrete triangular die element may be made as an individual component and anchored in suitable openings on the face of a plane cylinder. A second practical system for the production of such cylinders is to investment cast steel segments or saddles which are mounted on the cylinder periphery in adjoining relation to one another.

A third technique is to utilize bar elements, produced from extremely hard materials such as tool steel, which are mounted on the cylinder periphery by use of appropriate pins and/or fasteners. Unlike the discrete tooth component mounting procedures or those associated with the segment technique, mentioned above, this third procedure provides a reasonably sized member which serves better for replacement resulting from breakage or use damage. This latter form also lends itself to forging procedures, and machining steps can be minimized prior to cylinder mounting and the subsequent grinding stage of manufacture.

Beyond the specific apparatus variations in the production of triangular forms, and the mounting of such dies on the periphery of the cylinder, there is the possibility, described earlier, of variation in the triangular dimensions to alter the configuration and/or dimensions of the product being produced. Each triangular tooth form can be shallow or deep depending upon the desired gauge of the product. An increase in gauge, however, diminishes the planar areas, available on opposite sides of the center member, for attachment to the outer sheet members and weakens the product formed if the panel gauge is increased to excess. For example, with ⅜ inch circumferential spacing of triangular forms, the optimum panel gauge ranges from one-eighth of an inch to three-eights of an inch. If greater flat crush and column strength is desired, the center spacing can be halved or quartered and the triangular forms reduced in size. For larger forms and heavier gauges, the center distances can be increased, thereby providing for a proportional increase in the gauge of the combination.

Another variation provides a different product form. In this procedure, the two die cylinders employed are conical or tapered in form but identical in die arrangement to one another, and the two tapered cylinders are mounted for rotation on angularly placed axial shafts so that their engagement or nip provides a common line of connection. The discrete triangular die forms or shapes on the cylinder peripheries vary in size with respect to each increment of diameter so that the same number of elements are provided in each circumferential grouping or ring. In this way, the gauge of the web generated is the same across the cylinder width. Take-up, or gathering effect longitudinally, is a function of the size of the triangular form area and is independent of tooth height. The resulting product takes the form of an arc and curves to a point of overlap and terminus with respect to a given cylinder diameter and taper. Thus, each such form will require individual cylindrical shapes suited to achieve a given dimension. The purpose of such an apparatus is to produce cups, tubs, buckets, or barrels suitable for nesting. The medium sheet produced with this procedure must, of necessity, have connection to at least one outer element to effectively provide the required enclosure of the cellular form. Such buckets or tubs will require a disc form for bottoms and a folding procedure to form edges.

In all of the foregoing description, it has been contemplated that three sheets or webs are used in the formation of a panel. It will be understood by those skilled in the art, however, that the single medium configuration, i.e., the formed "center" member per se, has utilization as a packing material, or can be applied in a variety of applications to satisfy various product requirements. It will also be understood that the medium sheet formed with the triangular-cellular shapes can be bonded to only a single flat outer sheet for use in product areas where so-called "single face" corrugated is presently employed. Where situations demand spiral winding, such winding procedures dictate mandrel winding of a plain sheet followed by application of the single face form for production of tubes or larger barrel configurations.

Beyond the variations set forth in process and apparatus to vary product form, an additional configuration having extreme column and flat crush strength can be achieved by the addition of a reinforcing component within the cell openings of the formed center member. In this embodiment of the invention, a secondary feeder apparatus is provided which functions, immediately after the formation of the triangular web configuration, to introduce discs, rings, or washers equivalent in thickness to the inner gauge dimension of the formed web, through the upward facing opening at one side of the sheet so that these added components are forced into the space provided by the triangular forms that, in their dual adjoinment, actually constitute a square open area. After forcing these components into place, the formed combination is rolled between two rollers to reduce the gauge slightly and clamp these added components in place. The introduction into the structure of a disc or ring-shaped supporting member provides a strength equivalent to that of solid materials.

The use of rings or washer-like components provides a lightweight structure and serves effectively in metal applications. In paper or fiber applications of the invention, discs of "hardboard" or "cylinder board" also function effectively. Foamed plastic, plaster, gypsum and other products can also be introduced in a wet state into the triangular cell openings, for reinforcement or other purposes, if required in specific applications.

If the present invention is practiced with certain plastics or distensible materials that lend themselves to stretching and strain under pressure, a product variation can be achieved by adjustment of the "shearing" portions of the dies used in the forming apparatus. The product produced when such materials are employed, and when the apparatus is so adjusted, varies from that described previously in that the base line "cut" of the triangular form is not actually produced. By adjustment of the shear engagement between the cylinders, an opening can be provided in the space between the triangle base line cutting surfaces to minimize interference between these planes of engagement, so that a stretched membrane is produced across what is normally the cut or open area of the product described previously. This modification is desirable in certain cushioning and packaging applications where plastic products are employed and is also effective where a closed product is required. An example of a material that lends itself to this type of treatment is polypropylene. By utilizing low heat in the order of 175° F on the forming cylinders, stock 0.020 inch thick can be drawn across a 0.125 inch opening with a gauge reduction to 0.006 inch thus providing a web which completely closes the area that is normally open in the earlier described embodiments of the invention.

From the foregoing, it can be seen that substantial variations are possible in the products and apparatus of the present invention. Other configurations will be readily apparent to those familiar with the art.

BRIEF DESCRIPTION OF THE DRAWINGS

The foregoing objects, advantages, construction and operation of the present invention will become more readily apparent from the following description and accompanying drawings in which:

FIG. 7 is a view similar to FIG. 3 showing how a product constructed in accordance with the present invention may be reinforced;

FIG. 8 is a detail view of a portion of FIG. 7 showing one form of reinforcement element which may be employed;

FIG. 9A is a schematic plan view of a medium constructed in accordance with the present invention employing triangular forms of varying altitude to produce a web having a lateral cross section of varied shape;

FIG. 9B is a perspective view of a product which is fabricated utilizing the medium of FIG. 9A;

FIGS. 10A and 10B are cross sectional views of two different products having varying gauges constructed by use of media fabricated in accordance with the present invention;

DESCRIPTION OF THE PREFERRED EMBODIMENTS

Figure 1:
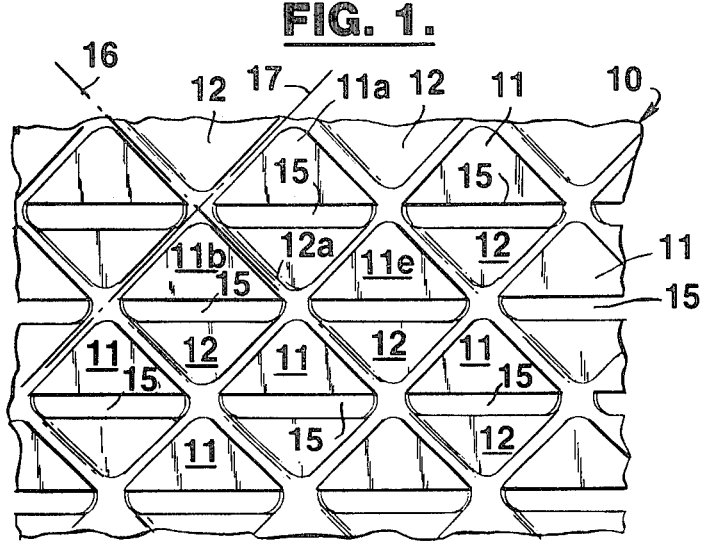
FIG. 1 is a plan view of a structural medium constructed in accordance with the present invention.
Figure 2:
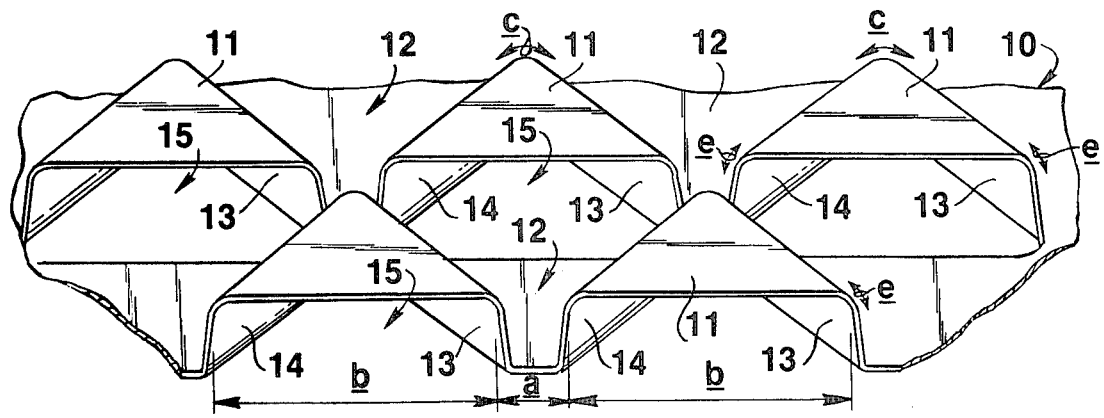
FIG. 2 is an enlarged perspective view of a portion of the structure shown in FIG. 1.

Referring initially to FIGS. 1 and 2, it will be seen that the structural medium of the present invention comprises a sheet 10, fabricated of a material such as metal, plastic, paper or fiber, having a deformed surface defining an array of closely adjacent projections 11 and intervening depressions 12 each of which comprises an integral portion of the sheet 10 and each of which has a triangular shape in a direction parallel to the plane of said sheet. The structure illustrated is essentially symmetrical in that, when the sheet is reversed through 180° the regions depicted as projections 11 become "depressions" when viewed from the opposite side of the sheet, and the illustrated depressions 12 similarly become "projections" when viewed from said opposite side of the sheet. The terms "projections" and "depressions" are therefore interchangeable in dependence upon the side of the sheet which is being utilized as a reference.

The edges of each triangular depression 12 are bounded by the edges of three adjacent triangular projections which are disposed in surrounding relation to said depression, e.g., as depicted in FIG. 1, depression 12a is bounded by the edges of the three projections 11a, 11b, and 11c. Moreover, as best shown in FIG. 2, the sheet of material adjacent at least two edges of each triangular projection 11 is folded so as to extend continuously from said two edges in a direction transverse to the plane of the sheet (essentially orthogonal, but slighlty inclined) to define transverse side walls 13, 14 which merge into the corresponding edges of the adjacent triangular depression 12 and which are accordingly shared by each projection 11 and an adjacent depression 12. The third side of each projection 11, however, does not include such a shared side wall and, instead, is freely spaced from the underlying corresponding edge of an adjacent depression 12 by an intervening slot 15. These slots 15, as will become apparent from the subsequent description, are produced by shearing the sheet 10 to produce a plurality of aligned, spaced cuts disposed longitudinally with respect to the web direction to achieve lateral relief in the sheet so that the side walls 13 and 14 can be folded into their desired configuration without tearing the sheet of distorting its gauge.

The unslit portion (designated a in FIG. 2) between the adjacent ends of the cuts or slits (designated b in FIG. 2) in each row of slits preferably has a length in the range of substantially 5% to 15% of the length of each slit b to minimize the space between the cuts while retaining the integrity of the sheet. The intervals or spaces a between the relief cuts b must be proportioned to the size of the parallel triangular spaces of projections 11 and depressions 12 and to the length of the relief cuts b. Each uncut interval a must approximate the horizontal radius c (see FIGS. 2 and 13) at the apex of the triangular form, as well as the radius d (see FIG. 13) in the perpendicular plane of the same apex point. Additional radii are important to assure appropriate relief of the material and minimization of friction during the folding of the shared sides 13, 14, these additional radii being designated e in FIG. 2 and being located at the junction of each triangular face of a projection 11 and the adjacent transverse side walls of shared sides 13, 14. The radius of the nose of each triangular projection 11, at points below the radius designated c at the extreme apex point of the triangular face of a projection 11, is of approximately the same dimension as the radius designated e.

As shown in FIGS. 1 and 2, the triangular projections 11 and depressions 12 are each of equilateral form although, as will be appreciated by those skilled in the art, the principles of the present invention can be employed in conjunction with triangular forms of different shape. When the equilateral form is employed, the triangular top surfaces of the several projections 11 cooperate with the triangular bottom surfaces of the adjacent depressions 12 to produce square cellular forms which are separated from one another by intervening upstanding ribs (comprising aligned transverse side walls 13 and aligned transverse side walls 14 respectively as best shown in FIG. 2) that are disposed along intersecting lines 16,17 (see FIG. 1). This array of upstanding, intersecting ribs achieves a grid-like reinforcement of the overall structure.

The triangular planar top surfaces of the several projections 11 are, in the embodiment of the invention shown in FIG. 2, disposed in generally coplanar relation to one another and cooperate to define a first discontinuous surface comprising one side of the structural medium. Similarly, the triangular planar bottom surfaces of the several triangular depressions 12 are also substantially coplanar with one another and define a second discontinuous surface comprising the other side of the structural medium. The distance between these two opposing discontinuous surfaces comprises the gauge of the formed medium, and this gauge may be a constant throughout the medium when the discontinuous surfaces are parallel to one another, or (as will be discussed subsequently in reference to FIGS. 10A and 10B) the gauge may vary along the length of the medium when the discontinuous opposing surfaces of the medium are disposed in planes which are curved and/or in planes which diverge away or converge toward one another. The opposing discontinuous planar surfaces may, moreover, be associated with one or more imperforate or perforate cover sheets which are adhesively or mechanically attached thereto to produce a structure which has even greater strength and/or a continuous outer surface, as may be necessary in certain applications.

Figure 3:
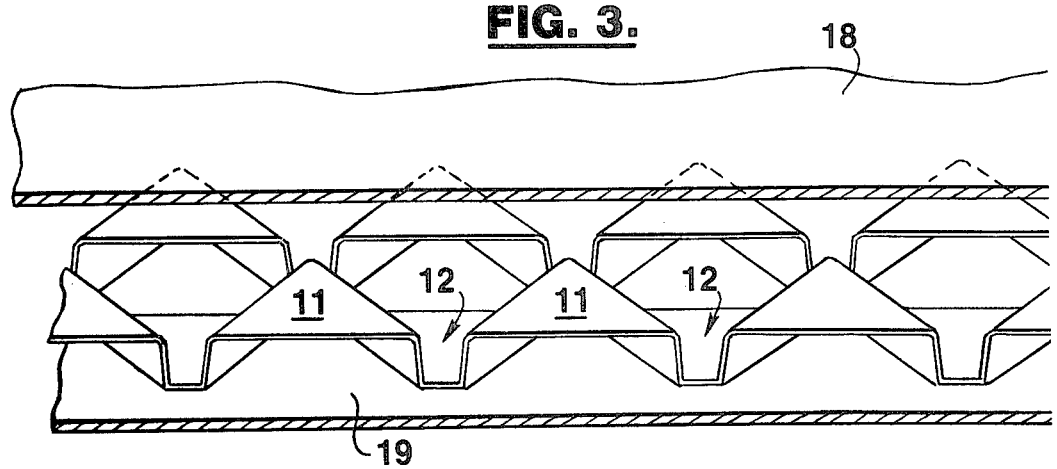
FIG. 3 is a perspective view illustrating how the structure of FIG. 2 may be combined with imperforate cover sheets.

FIG. 3 shows an arrangement of this latter type wherein the opposing discontinuous surfaces of the formed medium have a pair of imperforate cover sheets 18 and 19 affixed thereto, e.g., by use of an adhesive applied to the outer triangular surfaces of each depression 11 and each depression 12.

Figure 4:
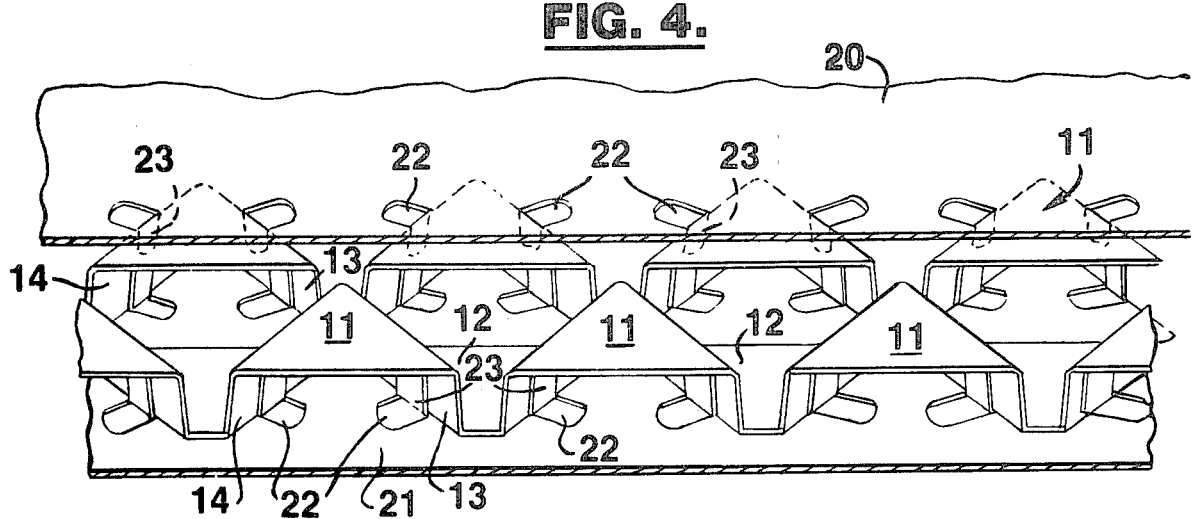
FIG. 4 is a view similar to FIG. 3 showing how the medium of the present invention may be utilized in conjunction with partially perforated, tab-defining cover sheets.

In an alternative form of the invention shown in FIG. 4, the cover sheets 20 and 21 are each partially perforated at 22 (in the fashion described in my prior U.S. Pat. No. 3,846,218, only a limited number of such partial perforations being depicted for purposes of simplicity) to define tabs 23 which may be bent out of the plane of each cover sheet into the region between said cover sheets in adjacent overlying relation to the aforementioned side walls 13, 14 of the intervening center medium. The tabs 23 associated with cover sheet 20 are, as shown in FIG. 4, located adjacent the outer sides of the several transverse walls 13, 14, whereas the tabs 23 associated with cover sheet 21 are disposed adjacent the inner surfaces of said walls 13, 14; and said tabs may be adhesively or mechanically attached to the facing surfaces of transverse walls 13, 14 to produce an overall structure of the type shown in FIG. 4 which is not only reinforced by the addition of the cover sheet but which is also of ventilating configuration in that air may readily pass through the entire structure via the several partial perforations 22 and the gaps between the several triangular projections and depressions of the center medium.

Various combinations of the structures shown in FIGS. 3 and 4 are, of course, possible. For example, only a single cover sheet, of either perforated or imperforate form, may be utilized. Alternatively, a pair of cover sheets may be employed, one of which is imperforate in the fashion shown in FIG. 3, and the other of which is partially perforated in accordance with FIG. 4. When one or more partially perforated sheets of the type shown in FIG. 4 are employed, moreover, the partially perforated sheet may be attached to the adjacent formed medium at the tabs alone, or it may also be attached to the center medium by additional adhesive or mechanical bonding between the cover sheet and the underlying triangular faces of the projections 11 and depressions 12.

Figure 5:
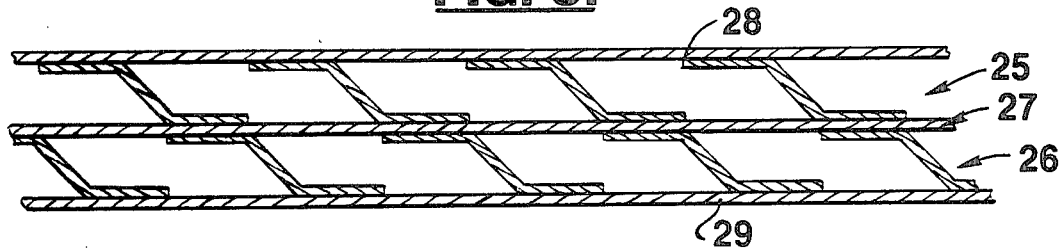
FIG. 5 is a cross-sectional view illustrating a multilayer product employing media of the type shown in FIG. 1.

A still further variation is shown in FIG. 5 wherein a multi-layer structure is produced comprising two media layers 25, 26 constructed with accordance with FIGS. 1 and 2, which are separated from one another by an intervening central sheet 27 and which are bounded on their outermost sides by cover sheets 28 and 29. The several sheets 27, 28, 29 may be perforate and/or imperforate in accordance with the preceding discussion, and the strength characteristics of the multi-layered structure may be varied by varying the disposition of the projections and depressions in one medium 25 relative to the projections and depressions in the other medium 26. Moreover while a two-layer structure has been shown in FIG. 5, it will be appreciated that three or more layers can be provided in analogous fashion in dependence upon the ultimate application of the structure.

Figure 6A:
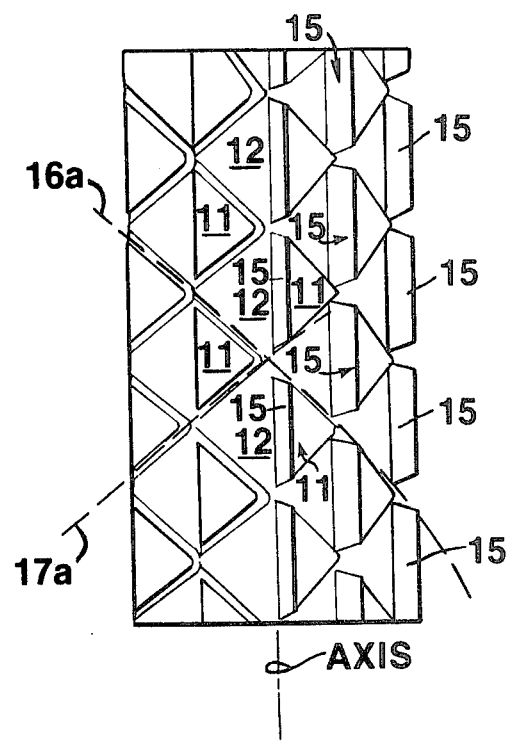
FIGS. 6A and 6B show to different cylindrical products, respectively, fabricated from the medium of the present invention.
Figure 6B:
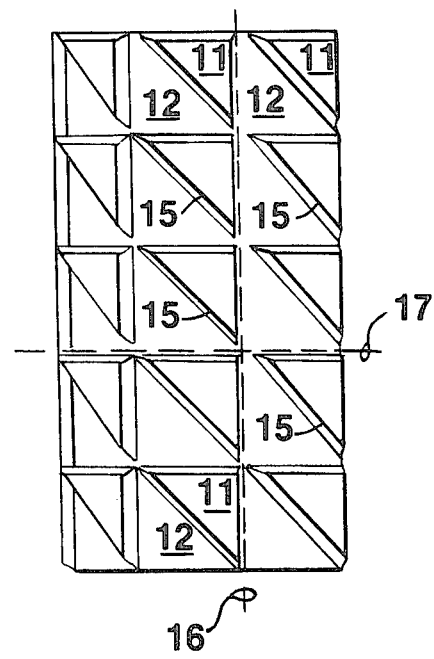

The medium shown in FIGS. 1 and 2 may be bent into cylindrical form when a product of that shape is desired, and the overlapping ends of such a cylindrically-shaped medium may have their corresponding projections and depressions nested within one another and affixed together to maintain the structure in its cylindrical configuration. The cylindrical form can assume the arrangement shown in FIG. 6A in which the several relief cuts and the resulting slots 15 of the medium are disposed along lines which are parallel to the axis of the cylinder so that the rib lines 16, 17 (FIG. 1) are disposed on 45° intersecting lines 16a, 17a with respect to the cylinder axis. Alternatively, as shown in FIG. 6B, the medium may be so wrapped that the several relief cuts and the resulting slots 15 in the medium are disposed along lines which are diagonal to the cylinder axis to place the rib lines 16, 17 in directions which are aligned with and at right angles to the cylinder axis, respectively.

In those applications where the medium alone does not exhibit sufficient strength, and where the strength is not sufficiently increased by the addition of cover sheets thereto, further reinforcement can be effected by inserting a reinforcing material or a reinforcing component into some or all of the cells, as discussed earlier. Where such reinforcing elements are employed, the elements may take the form of discs, rings, washers or the like. One such arrangement is shown in FIGS. 7 and 8 wherein a product of the general type shown in FIG. 3 has its column and flat crush strength increased by insertion of ring-shaped elements 30 into the pocket areas formed between the alternately disposed triangular surfaces of the several projections and depressions in the formed medium. Each ring 30 extends through one of the aforementioned slots 15 and includes a portion which underlies the top triangular surface of a projection 11 and a further portion which overlies the upwardly facing bottom surface of an adjacent depression 12. The edge surfaces of the ring 30 may be inclined to comform to the corresponding inclinations of the intervening side walls 13, 14 described previously. After the several rings 30 have been forced into place via the aforementioned slots 15, they may be clamped in position by pressing the various transverse side walls 13, 14 into closely confirming engagement with the outer edge of the adjacent ring 30. The introduction of such disc or ring-shaped structures give the overall medium a strength equivalent to that of a solid material.

The several rings 30 may have an annular configuration as shown in FIG. 7, or they may be solid; and they can be fabricated of various materials. Instead of providing such rings, other reinforcing materials such as foam plastic, plaster, gypsum, etc., can be employed to fill some or all of the cell openings if required in the specific application.

In the medium shown in FIG. 1 the various triangular projections and depressions are all of the size, and the several projections and depressions are disposed along a plurality of essentially parallel rows each of which is occupied by alternately inverted triangular projections and depressions which are disposed directly adjacent one another. As a result, the several rows of projections and depressions are parallel to one another with the distance between each adjacent pair of rows corresponding to the altitudes of the triangular projections and depressions, the several slots 15 are disposed along lines which are parallel to one another, the several transverse sidewalls 13 are disposed along further lines which are similarly parallel to one another, and the several transverse sidewalls 14 are disposed along still further lines which are parallel with one another. In accordance with variations of the invention, however, the triangular projections and depressions which are disposed adjacent one another in one such pair of rows may have a size different from the triangular projections and depressions between another pair of rows so that the spacing between various different rows differs from one another and the various slots 15, the various sidewalls 13, and the various sidewalls 14 are disposed along respective lines which are not straight but, instead, exhibit a desired curvature. In short, by appropriately varying the sizes of the various triangular projections and depressions throughout the medium, it is readily possible to produce any desired change in the shape of the medium and, by varying the heights of the transverse sidewalls 13, 14 throughout the medium it is also possible to achieve any desired variation in the gauge (or external surface configuration) of the medium. These aspects of the invention are shown in FIGS. 9 and 10.

FIG. 9A shows a variant form of medium (which can be fabricated by an apparatus of the type to be described hereinafter in reference to FIG. 14) wherein the alternating triangular projections and depressions in row 31 are all of the same height but have a greater height than those in an adjacent row 32, with the heights of the said alternating projections and depressions decreasing successively in further adjacent rows 33, 34, 35, and 36. By reason of this variation in the sizes of the several projections and depressions, from row to row, the overall medium was curved edges 37 and 38 due to the disproportionate gathering of the web material between said edges 37 and 38. The resultant medium can be provided with cover sheets, e.g., of the general type described in reference to FIG. 3, and is useful in the production of tapered cylindrical products of the general type shown in FIG. 9B.

In the arrangements of FIGS. 10A and 10B the heights of the various transverse sidewalls 13, 14 are varied (in accordance with considerations to be discussed hereinafter in reference to FIG. 13), in a predetermined manner to provide a desired variation in the gauge of the final product. In the arrangement of FIG. 10A, the variation is such that the outer surfaces of the product are each curved as at 40 and 41. In the arrangement of FIG. 10B, the outer surfaces 42 and 43 are each flat, but said surfaces 42 and 43 are variably spaced from one another to provide the product of tapered cross section. Combinations of the arrangements shown in FIG. 10A and 10B may, of course, be provided, i.e., by appropriate control of the heights of the sidewalls 13 and 14 in the medium one boundary surface of the final product may be curved while the other is flat, and the spacing between said surfaces may be varied as desired or necessary.

The structural medium of the present invention is formed, in general, by slotting the planar web of material to provide a plurality of spaced aligned slits along each of a plurality of parallel rows, the unslit portion of the web between adjacent ends of the slits in each row having a length in the range of 5% to 15% of the length of each slit in that row (for the reasons previously discussed) and the unslit portions of the web in each row being positioned opposite slit portions of the web (preferably opposite the mid-point of said slit portions) in the adjacent rows. The portions of the web located along the several slits are depressed away from the plane of the web into a plane parallel to the plane of the web while additional portions of the material are simultaneously folded into planes disposed transverse to the plane of the web along pairs of lines which extend respectively from opposing ends of each slit in each row in converging relation to one another toward an unslit portion of the web in an adjacent row. By thus slitting and folding the web, the surface of the web is deformed into an array of closely adjacent triangular projections and depressions which are disposed in alternately inverted relation to one another between adjacent pairs of said rows, and from row to row, without altering the actual gauge of the web material.

The sequence of steps described above can be effected by use of hand tools or various mechanisms. The steps can be achieved in high production fashion, by use of a dual-cylinder cutting and folding apparatus of the type shown in FIG. 11.

Figure 11:
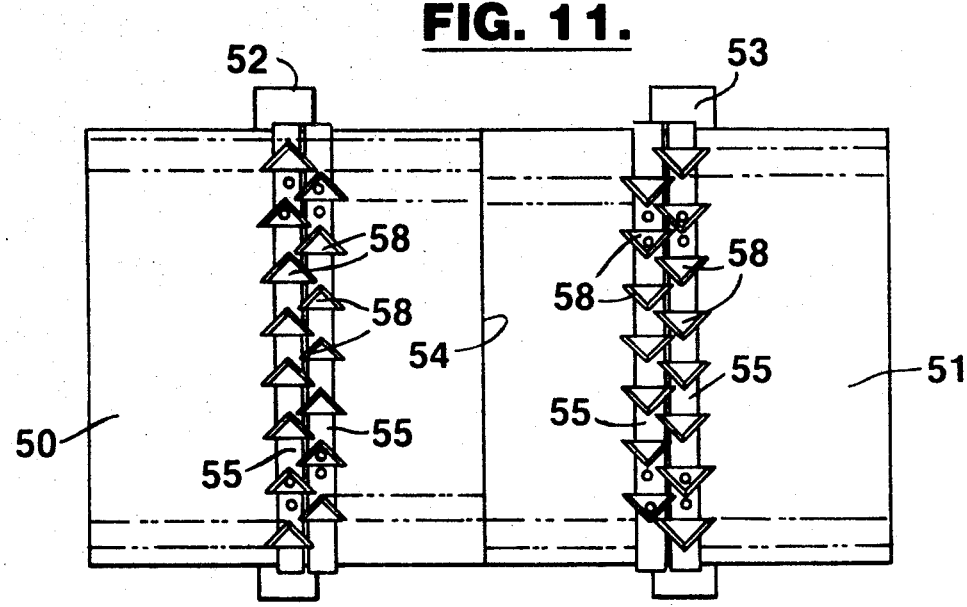
FIG. 11 is a partial schematic view of a pair of forming cylinders adapted to cut and fold a web to produce the medium of the present invention.

In the arrangement of FIG. 11 a pair of forming cylinders 50, 51 are mounted for rotation, in opposing directions and in surface-to-surface engagement with one another, on a pair of parallel axes 52, 53. The surface of each cylinder supports a plurality of triangular die elements which completely cover each cylinder surface (only a very few such die elements are shown for each cylinder in FIG. 11, to simplify the drawing) with the die elements carried by one cylinder being oriented in a direction opposite to the die elements carried by the other cylinder, and with the die elements on one cylinder being so positioned relative to the die elements on the other cylinder that, as said cylinders rotate in opposing directions, each die element on one cylinder periodically enters and then leaves the triangular space defined between a cluster of three adjacent die elements on the other cylinder. A web of material which is fed through the cylinders at their nip 54 is accordingly formed in the manner shown in FIGS. 1 and 2 as the cylinders 50, 51 rotate.

Figure 12:
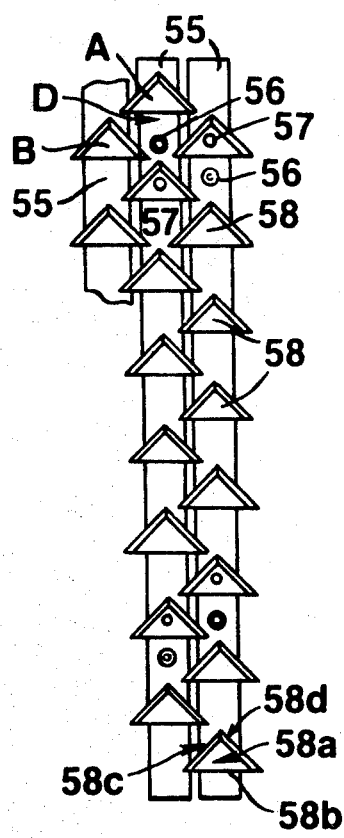
FIG. 12 is a perspective view of two bars having integral triangular dies, such as may be employed in the apparatus of FIG. 11.

More particularly, referring to both FIGS. 11 and 12, the surface of each cylinder carries a plurality of elongated bars 55 which are oriented in a direction parallel to the rotational axis of the cylinder and which have a length substantially equal to the axial length of the cylinder surface. Each bar element is mounted in position on its associated cylinder surface by means of screws 56 and pins 57 which accurately align the bar elements on a given cylinder relative to one another, align the bar elements on one cylinder relative to those on the other, and permit any given bar element to be readily removed and replaced as a unit if necessary, e.g., due to breakage of a die element. Each bar 55 is machined on one surface thereof to provide as an integral part of the bar, a plurality of axially spaced, similarly oriented, triangular die elements 58. As best shown in FIGS. 12 and 13, each such triangular die element 58 has a flat triangular top surface 58a which is disposed in a plane parallel to the axis of its associated cylinder, and three side walls which extend respectively from the edges of said triangular top surface 58a toward the periphery of the forming cylinder. One of the die side walls 58b extends in a plane which is substantially orthogonal to the axis of the cylinder, and the other two die side walls 58c and 58d extend from the associated edges of surface 58a in inclined planes which are nonorthogonal to the axis of the forming cylinder and which diverge from one another toward the periphery of the forming cylinder. The substantially orthogonal edge 58b of each die on each forming cylinder cooperates, at the nip of the contra-rotating forming cylinders 50, 51, with another such substantially orthogonal die surface on a complementary die located on the other forming cylinder, to shear the web which is passing through the nip of the cylinder, thereby to produce a cut in said web having a length corresponding to the length of the die surface 58b; and the inclined die surfaces 58c and 58d act to fold portions of the web extending from the opposing ends of each such cut into the transverse side walls 13, 14 described previously.

As best shown in FIG. 12, the several bars 55 on each forming cylinder are so positioned relative to one another that the triangular dies on one bar are positioned in staggered relation to the triangular dies on a directly adjacent bar. The shearing surfaces 58b of the die on each bar are oriented in a direction at right angles to the axis of the associated forming cylinder (i.e., they are oriented in the longitudinal direction of web travel through the nip of the forming cylinders) and, due to the staggered configuration of the dies on adjacent bars, the shearing surfaces 58b of dies on alternate ones of said bars are in alignment with one another.

The dies on the several bars on each cylinder are disposed in closely adjacent relation to one another in a plurality of circular rows which extend about the axis of the associated forming cylinder, and the adjacent apices of the dies in adjacent ones of said rows are spaced from one another by a distance in the range of 5% to 15% of the length of the shear surface 58b of each die. Moreover, the nose of each die (i.e., the apex opposite to shear surface 58b) is located adjacent to, but substantially similarly spaced from, the space between the aligned shear surfaces 58b of the dies in the adjacent rows so that the dies are clustered in groups of three to define a substantially triangular space therebetween, e.g., see the cluster of dies A, B, C and the intervening space D in FIG. 12. It will be appreciated that the triangular space D is oriented in a direction opposite to the orientation of the dies which define that space, and each space D is accordingly oriented in the same direction as one of the triangular dies on the other forming cylinder so that, as the forming cylinders 50, 51 rotate, each die on one forming cylinder enters the triangular space between a cluster of three dies on the other forming cylinder at the nip of the cylinder, to cause shear engagement between the complementary surfaces 58b of dies on the two different cylinders while the inclined surfaces 58c, 58d fold the web material, in the fashion described previously, into the triangular space D. By reason of the various dimensional considerations discussed earlier, this folding is accomplished without tearing the web, and causes a longitudinal take-up of the web without any lateral take-up thereof.

By slight axial displacement of the positions of the dies on one forming cylinder relative to those on the other forming cylinder, the shearing action accomplished between the cooperating faces 58b of corresponding dies in the two cylinders can be changed into a drawing action when the web being formed is fabricated of appropriate plastic material, to produce a stretched, comparatively thin membrane across the region between the cooperating die surfaces 58b, rather than actually cutting the web in this region. The modified product thus produced has value in certain applications where it is desirable to utilize a formed medium which has a completely continuous surface uninterrupted by cuts or perforations therein.

Figure 13:
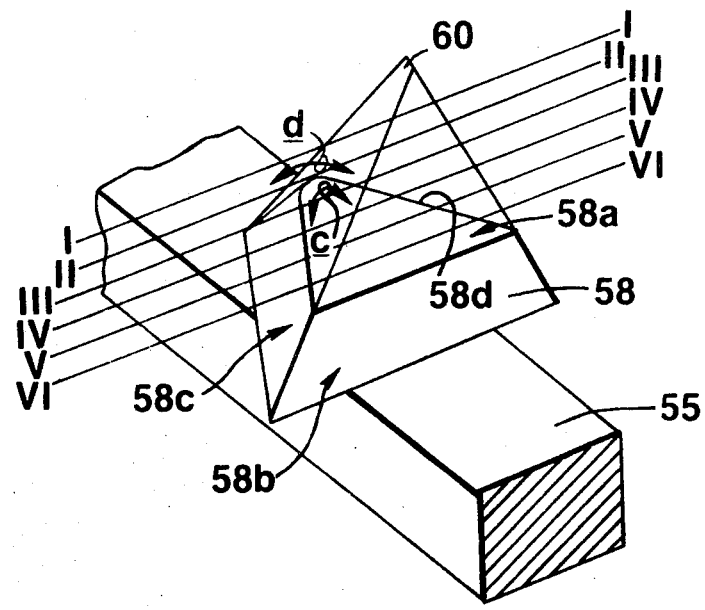
FIG. 13 is a schematic illustration of a portion of one of the dies shown in FIGS. 11 and 12, depicting possible variations in configuration of the die.

A further aspect of the invention, useful for example in the formation of products of the types described in reference to FIGS. 10A and 10B, is illustrated in FIG. 13. If the sides 58b, 58c, 58d of the basic die element 58 were to be extended upwards relative to bar 55, they would intersect at an apex 60, and the die would have a half-pyramid shape. If a die of this shape were then reduced in height to the level designated by the line I—I, the upper surface of the die would have a triangular shape similar to surface 58a, but of smaller size. Such a die would, when used in the fashion described previously, produce a projection or depression in the web material having a triangular face of smaller size, and transverse side walls of greater height. If the height of the half-pyramid die is reduced to the levels designated II—II through IV—IV, each such reduction in height of the die would correspondingly increase the size of the triangular face of the deformed web while decreasing the height of the transverse side walls formed therein. By appropriate selection and patterning of the heights of the various dies in the forming cylinders, therefore, projections and depressions of varying different heights can be produced, to permit the fabrication of a final product having any desired external gauge, or any desired variation in external gauge. It will be appreciated that when the height of the side walls is increased, by a related increase in the height of the forming die, the material which is used to provide an increase in height of the transverse side walls 13, 14 is taken from the triangular lateral face of the formed projection or depression in the web, and the dimensional variation in the web projection or depression is accordingly accomplished without any change in the longitudinal take-up of the web.

Figure 14:
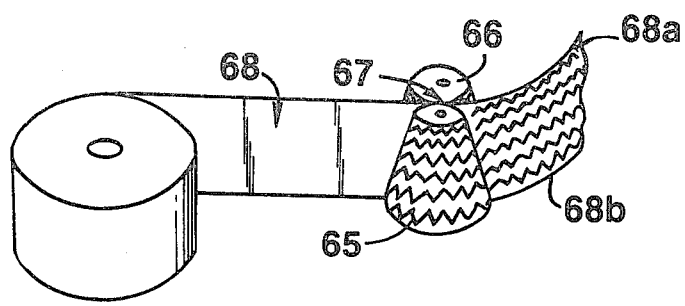
FIG. 14 is a schematic perspective view showing how tapered forming cylinders, employing triangular dies of varying size, may be used in the production of a curved medium of the type shown in FIG. 9A.

FIG. 14 schematically illustrates a different type of forming cylinder arrangement which can be employed to produce the product shown in FIG. 9A. In this modified arrangement, the forming cylinders 65, 66 are each of conical configuration and are mounted for rotation on mutually inclined axes to accommodate the taper of the cylinders thereby to produce a parallel relationship between the cylinders at their nip 67. As a result, the nip provides a vertical plane through which a web 68 may pass. The surfaces of the two cylinders 65, 66 carry triangular dies of the general type described in reference to FIGS. 11-13, but the sizes of the various dies are graduated to provide smaller dies adjacent the smaller ends of the two cylinders which progressively increase in size for dies disposed closer to the larger ends of the two conical cylinders. The dies on one cylinder are inverted in orientation relative to those on the other cylinder, to cooperate with one another so as to achieve the shearing and folding functions described earlier.

As the web 68 passes through the nip 67 of the conical forming cylinders 65, 66, a product of the type shown in FIG. 9A is produced. The web is cut and folded to generate a product having a curvature, caused by variations in the folding function, which is directly proportional to the number of triangular dies which are disposed along a given web length. At the smaller ends of the forming cylinders, more folds are provided along the edge 68a of the web than are provided at its opposite edge 68b. The curved product which is produced as a result is useful in the fabrication of components having a conical form, e.g., tubs, cups, or buckets having a tapered cylindrical shape.

Figure 15:
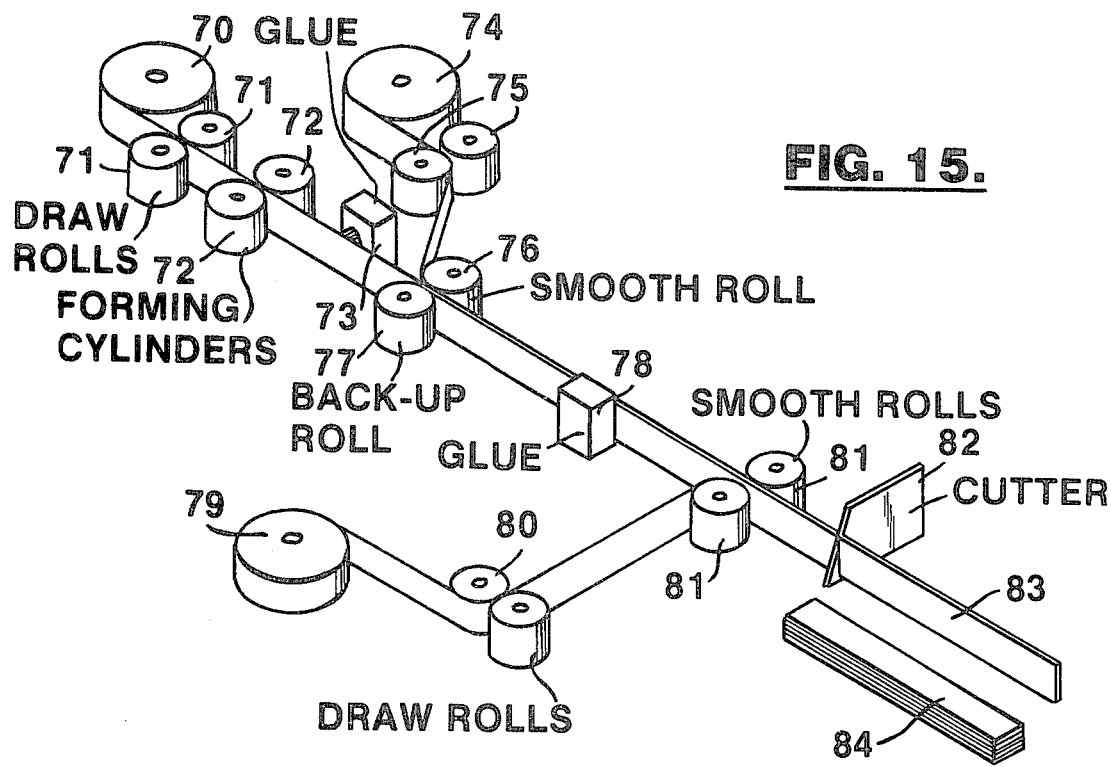
FIG. 15 is a schematic view of an apparatus which may be employed in the high speed production of products of the type shown, for example, in FIG. 3.

FIG. 15 is a schematic three-dimensional illustration of an apparatus which can be employed in the high speed production of a product of the type shown in FIG. 3. The web material which is to be deformed into the medium of the present invention is taken from a supply roll 70 and fed by means of draw rolls 71 through a pair of forming cylinders 72 of the type described in reference to FIG. 11. The deformed medium then passes a glue applicator 73 which applies adhesive to the lateral triangular faces on one side of the formed medium. A web of cover sheet material is taken from a further supply roll 74 by means of draw rolls 75 and is fed through a pair of rolls 76, 77 into contact with the adhesive bearing side of the formed medium for lamination therewith.

Roll 76, which is used during the laminating step, can be smooth-surfaced and works in conjunction with the planar surface of the web taken from roll 74. Roll 77, however, which is disposed adjacent the deformed surface of the center medium, may have a surface configuration corresponding to that of one of the forming cylinders of FIG. 11 so that the triangular projections and depressions on the surface of roll 77 provide a back-up function permitting full pressure to be applied across the web width without distorting the projections and depressions in the center web.

Immediately following the lamination of cover material 74 onto the formed center web, the laminate passes a further glue applicator 78 which applies adhesive to the opposite side of the laminate. The other cover sheet material, taken from a further supply roll 79 by means of draw rolls 80, is laminated to the opposite side of the product under pressure supplied by smooth rolls 81. The final panel then passes through a cutter 82 which severs a desired length 83 of the finished product and stacks the severed lengths as at 84.

While I have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention, I claim:

1. The method of forming a structural medium comprising the steps of slitting a planar web of material to provide a plurality of spaced aligned slits along each of a plurality of parallel rows, the unslit portion of said web between adjacent ends of the slits in each row having a length in the range of 5% to 15% of the length of each slit in that row, the unslit portions of the webs in each row being positioned opposite slit portions of the web in the adjacent rows, and depressing the portions of said web along said slits away from the plane of said web and into a plane parallel with the plane of said web while simultaneously folding the material of said web into planes disposed transverse to the plane of said web along pairs of lines which extend respectively from opposing ends of each slit in each row in converging relation to one another toward an unslit portion of the web in an adjacent row, to deform the surface of said web into an array of closely adjacent triangular projections and depressions which are disposed in alternately inverted relation to one another between each adjacent pair of said rows and from row to row.

2. The method of claim 1 wherein said depressing and folding steps produce transverse side walls of said material along said converging lines each of which side walls is shared by a triangular projection and an adjacent triangular depression, and substantially simultaneously produces a flat triangular top surface for each of said projections and a flat triangular bottom surface for each of said depressions, said side walls being disposed in planes which are nonorthogonal to the planes of said top and bottom surfaces.

3. The method of claim 2 wherein the transverse side walls produced in different parts of said medium have different heights respectively, the areas of said triangular top and bottom surfaces in different parts of said medium having different dimensions respectively.

4. The method of claim 2 including the step of superposing a cover sheet on one side of said medium and adhesively attaching spaced portions of said cover sheet to the flat top surfaces of said triangular projections.

5. The method of claim 4 including the step of superposing a further cover sheet on the other side of said medium and adhesively attaching spaced portions of said further cover sheet to the flat bottom surfaces of said triangular depressions.

6. The method of claim 2 including the step of superposing a partially perforated cover sheet on at least one side of said medium, depressing the partially perforated portions of said cover sheet toward said medium to produce tabs which extend transversely from said cover sheet along said transverse side walls of said medium, and adhesively attaching said tabs to said transverse side walls.

7. The method of claim 1 including the step of wrapping a length of said formed medium into a cylindrical configuration, and nesting the triangular projections and depressions at one end of said length into complementarily shaped depressions and projections respectively at the other end of said length to provide a seam between said ends.

8. The method of claim 1 wherein said slitting step produces slits of different length in different ones of said rows respectively.

9. The method of claim 8 wherein said slitting step is operative to produce at least two pairs of rows which are differently spaced from one another, said depressing and folding steps producing adjacent triangular projections and depressions between one of said pairs of rows which have dimensions different from the adjacent triangular projections and depressions between the other of said pair of rows.

10. The method of claim 1 wherein the triangular projections and depressions in different parts of said medium have different cross-sectional areas respectively.

* * * * *